Figure 1:
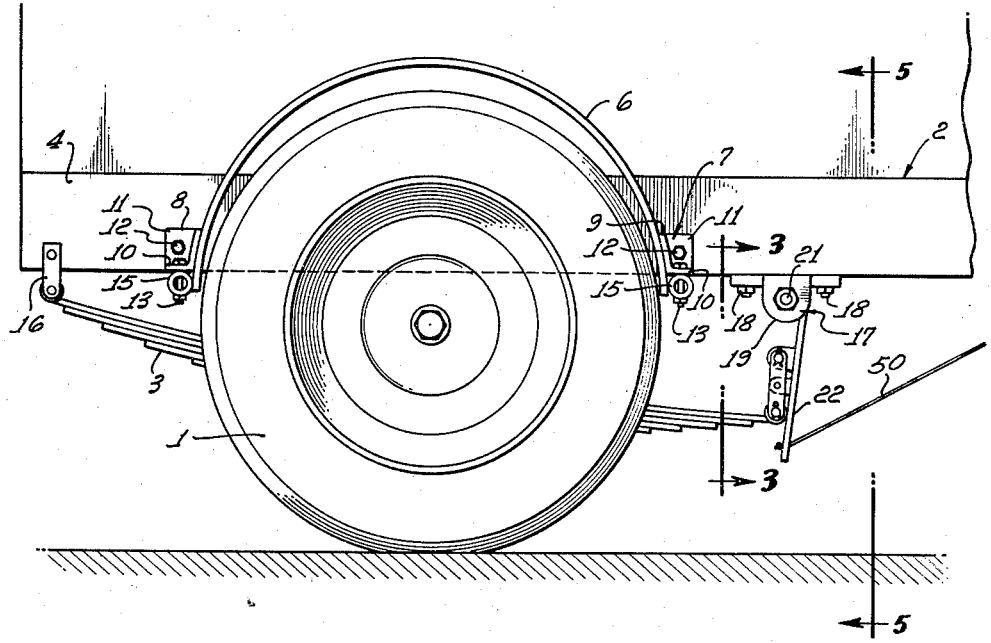

Sept. 6, 1960

R. C. SHEARMAN ET AL 2,951,559

BRAKING MEANS FOR VEHICLES

Filed Feb. 1, 1957

4 Sheets-Sheet 1

INVENTORS.
ROGER C. SHEARMAN
ROGER K. SHEARMAN
BY
ATTORNEY.

Sept. 6, 1960 R. C. SHEARMAN ET AL 2,951,559
BRAKING MEANS FOR VEHICLES
Filed Feb. 1, 1957 4 Sheets-Sheet 2

INVENTORS.
ROGER C. SHEARMAN
ROGER K. SHEARMAN
BY
ATTORNEY.

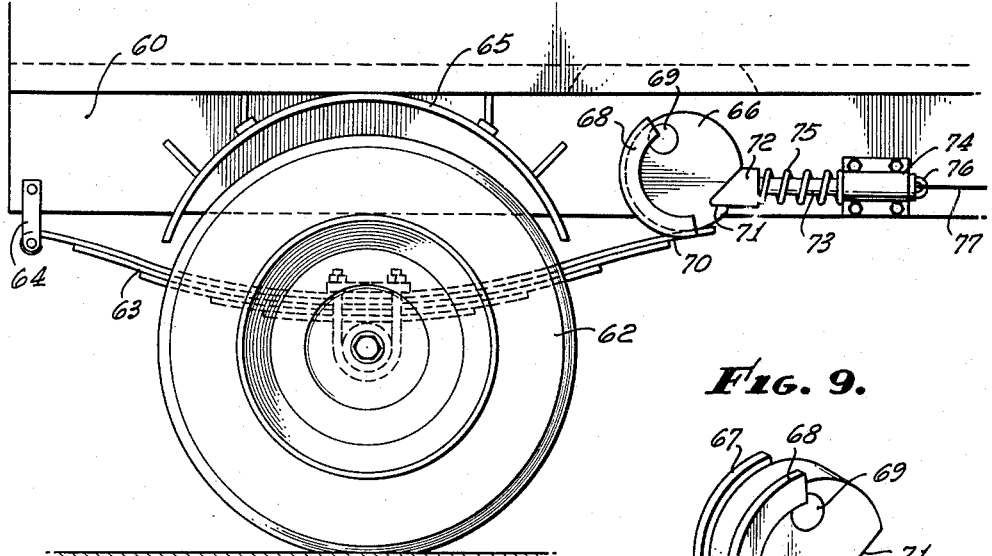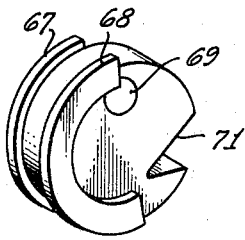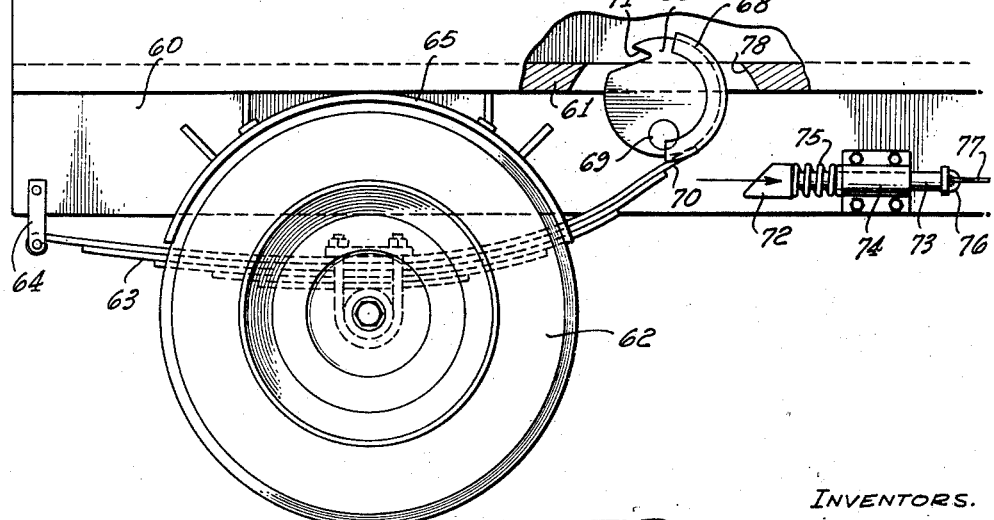

Sept. 6, 1960   R. C. SHEARMAN ET AL   2,951,559
BRAKING MEANS FOR VEHICLES

Filed Feb. 1, 1957   4 Sheets-Sheet 4

INVENTORS.
ROGER C. SHEARMAN
ROGER K. SHEARMAN

BY
*Calvin Brown*
ATTORNEY.

United States Patent Office 2,951,559
Patented Sept. 6, 1960

2,951,559
BRAKING MEANS FOR VEHICLES
Roger C. Shearman and Roger K. Shearman, both of 19200 Linnet St., Tarzana, Calif.
Filed Feb. 1, 1957, Ser. No. 637,669
3 Claims. (Cl. 188—29)

The present invention relates to a braking means for vehicles of any type, but specifically for trucks and trailers.

The trucking of goods of every character has become a national industry, with trucks moving at high speeds over the highways. Naturally, such extensive application of trucks has resulted in numerous accidents resulting in death not only to the truck driver but to others, due to faulty brakes or brakes which fail to hold on grades. The ordinary brakes may fail altogether by burning up due to excessive friction of the brake lining on the drums, thus releasing the truck for uncontrolled movement. As the trucks carry heavy weights of merchandise, weighing into the tons, free movement of such a vehicle can only result in disaster. In certain localities, it has been proposed to provide side roads communicating with the main highway which a run-away truck may turn onto for the purpose of gradually stopping the truck due to elevation of the side roadway. This presupposes, however, that other vehicles are not on the same lane of the highway or in any manner obstructing the highway so that the truck driver is enabled to reach the side road.

The present invention has for an object a positive means for braking movement of a land vehicle such as a truck, semi-truck, trailer, or, for that matter, a passenger vehicle, bus, or tractor, and in such a manner that if the usual brakes on the said vehicle fail, the emergency braking system of the present invention may be employed, with assured and positive results, in the stopping of vehicle movement.

Further objects include a braking system and means for vehicles which is positive in operation, efficient, simple in structure, easily adaptable to vehicles of all forms, and generally superior to emergency braking means and systems now generally employed.

With the above mentioned and other objects in view, the invention consists in the novel and useful provision, formation, construction, association, and relative arrangements of parts, members and features, all as shown in certain embodiments in the accompanying drawings, described generally, and more particularly pointed out in the claims.

Figure 2:
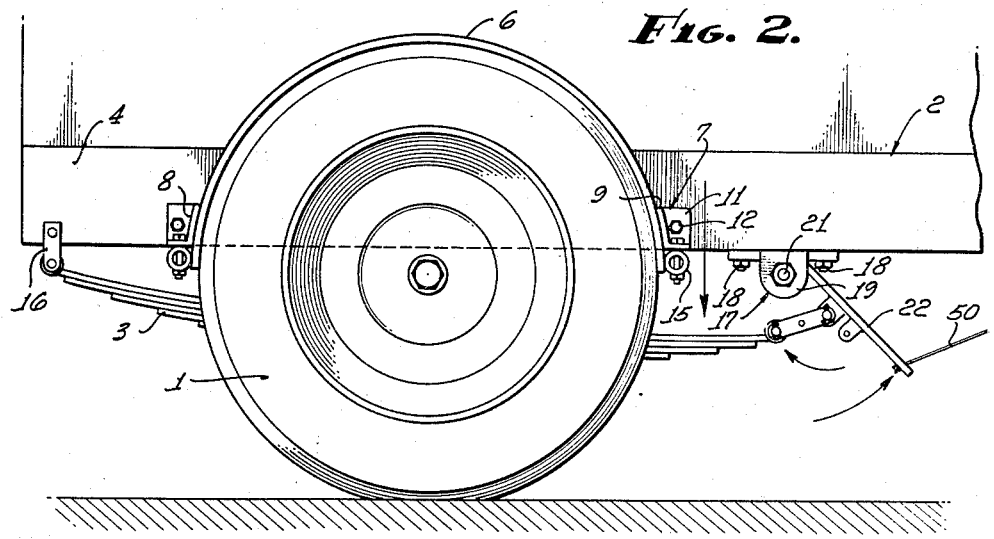
Figure 3:
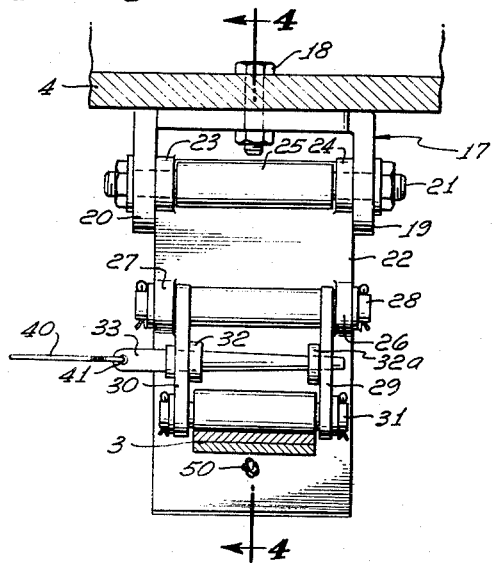
Figure 4:
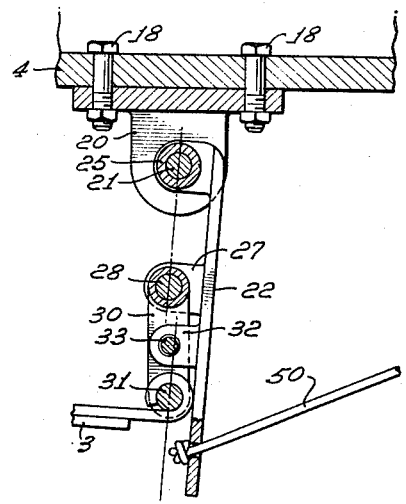
Figure 5:
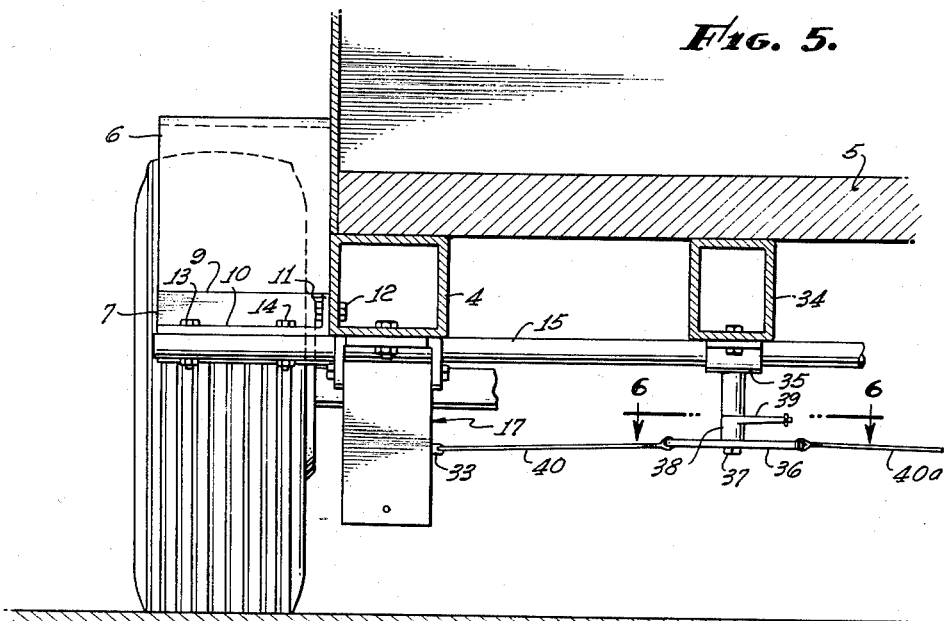
Figure 6:
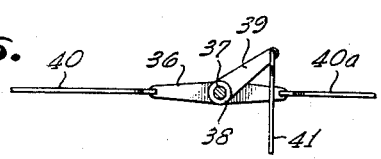
Figure 10:
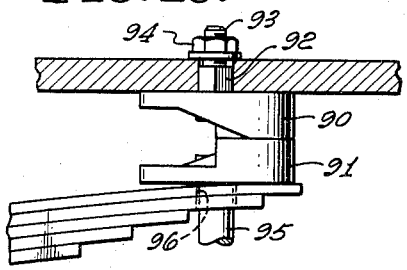
Figure 11:
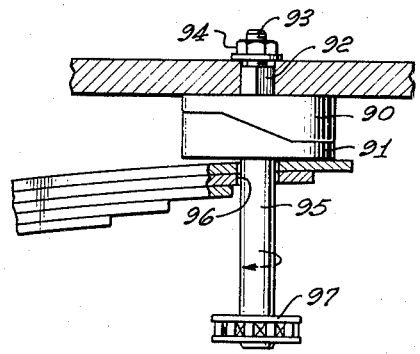
Figure 12:
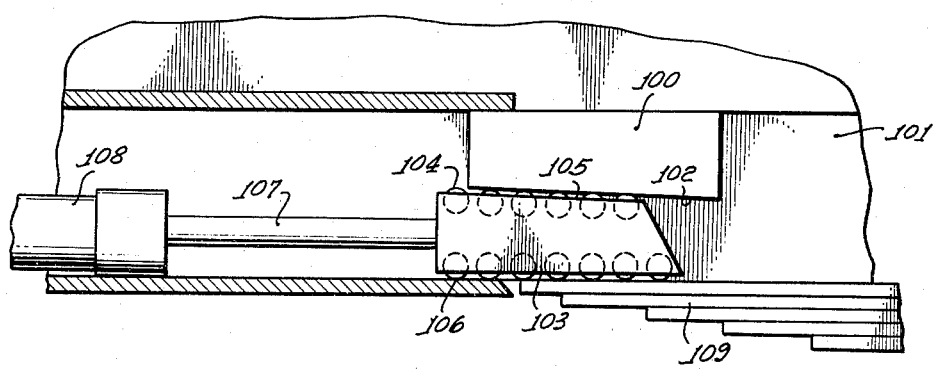
Figure 13:
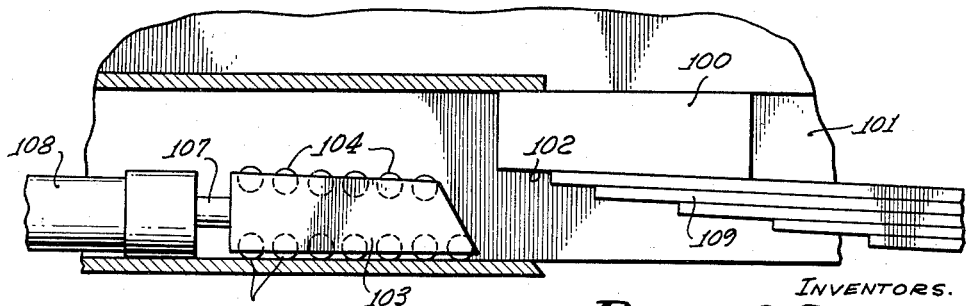

In the drawings:

Figure 1 is a fragmentary side elevation of a truck and showing one form of means for effecting braking action of a wheel, Figure 2 is a view similar to that of Figure 1, certain elements of the invention being in a moved position to afford braking action of the wheel, Figure 3 is a fragmentary sectional view on an enlarged scale, taken on the line 3—3 of Figure 1, Figure 4 is a fragmentary sectional view on the line 4—4 of Figure 3, Figure 5 is a fragmentary sectional view on the line 5—5 of Figure 1, Figure 6 is a fragmentary plan view taken on the line 6—6 of Figure 5, Figure 7 is a fragmentary side elevation of a modified form of the invention from that of Figures 1 to 6, Figure 8 is a view similar to that of Figure 7, the parts being in changed relationship, to afford a braking action of the wheel, Figure 9 is a perspective view of an element of the invention utilized in that form of the invention shown in Figures 7 and 8, Figure 10 is a fragmentary sectional view of a modified form of invention for affording braking action, Figure 11 is a view similar to that of Figure 10, the parts being in changed relationship, Figure 12 is a fragmentary view, partly in section, of a further modification of the invention, the parts being in one position, and Figure 13 is a fragmentary view similar to that of Figure 12, certain parts being in changed relationship.

Referring now with particularity to the drawings, and specifically to that form of the invention depicted in Figures 1 to 6, inclusive, the vehicle to which the invention is applied may be a truck, a semi-trailer type, a trailer, bus or tractor, and may incorporate single wheels or parallel wheels, or wheels in tandem. In the present instance, and for the purpose of illustration only, the truck is provided with a pair of rear wheels 1 which support the truck body 2, through the medium of semi-elliptical springs 3. One side of the rear portion of the truck is depicted in these figures, it being understood that the opposite side is of similar construction. As is usual in vehicles of this character, the truck has a framing 4 and the platform 5, as shown in Figure 5, is mounted on the framing. The wheel 1 includes the usual tire and it is intended, in the illustration, to provide a means for engaging the tread of the tire to brake movement of the vehicle according to the demands of the driver of the vehicle, such as in the case of a brake failure utilizing, for instance, the ordinary drum type brakes. Thus, it is within the contemplation of the present invention to provide a drum in place of the tire, for performing a braking operation, employing the principles of the present invention.

In the embodiment of the invention shown in Figures 1 to 6, an arcuate brake band 6 overlies the tread of the tire and specifically the upper portion of said tread, the said band subtending a given degree of arc which may be 180° or less, the said band being of a width as shown in Figure 5 so as to substantially overlie the tire tread transversely thereof, with ends of said band 6 secured to the framing 4. In the present instance, brackets 7 and 8 are externally secured to the said band 6 adjacent ends thereof, and the brackets are of similar construction although fabricated for front and rear positions relative to the said band. Thus, bracket 7 has two angularly related flanges which extend the width of the band, as shown at 9 and 10 in Figure 5, and an end connecting flange between flanges 9 and 10, as shown at 11. Figure 11 is bolted at 12 to the framing 4, while the flange 10 is bolted, as shown at 13 and 14, to a tube 15 which is passed transversely beneath sides of the framing 4 of the vehicle. As previously stated, a like construction is provided for the bracket 8 and, accordingly, the same numbers will be applied for this portion of the invention. Front and rear tubes 15 extend transversely of the vehicle framing so that the brackets on the opposite side of the vehicle from the showing of the several figures will be similarly arranged and held. The band 6 is of heavy stock and may be solid, as shown in Figure 5.

It is contemplated that a given arc of the tread of the tire should be brought into pressure engagement with the inner or concave surface of the band 6 so as to stop any movement of the wheel or wheels. To accomplish this, and in the embodiment illustrated in Figures 1 to 6, the semi-elliptical springs 3 for each side of the vehicle are so arranged with relation to the framing that the framing may be dropped so as to forcibly bring the band 6 into tire tread engagement as, for instance, illustrated in Figure 2. As is common practice, one end of the semi-elliptical spring 3 is connected to the framing 4 by a shackle 16, and it is understood that we are describing one side of the vehicle, the opposite side being the same, while the opposite end of the elliptical spring 3 is so mounted with relation to the framing as to be moved to a changed position, to wit, from the position shown in Figure 1 to that of Figure 2. To accomplish this, we provide the structure shown in Figures 3 and 4, wherein there is mounted beneath the framing 4 a U-shaped plate or hanger, designated generally as 17, any convenient means being employed for the mounting thereof, such as by bolts 18, the legs 19 and 20 of the said hanger being provided with aligned bores through which a bolt 21 is passed and mounted upon said bolt 21 is a supporting lever 22. This lever is of extended width, as shown in Figure 3, and bridges the gap between the legs 19 and 20 of the hanger 17. The upper end of the said lever is provided with a pair of knuckles 23 and 24, and intermediate the knuckles is a spacer sleeve 25 carried on bolt 21. As shown in Figure 4, the knuckle portions are offset relative to the plane of the lever. The said lever is provided with a pair of spaced apart, aligned lugs 26 and 27, which are adjacent the side edges of the said lever, the said lugs provided with aligned bores through and between which is passed a bolt 28. Carried on the bolt are a pair of spaced apart shackle arms 29 and 30 adjacent one end of each shackle arm. The opposite ends of the shackle arms are bored to receive a shackle bolt 31 passed through the arms, and this shackle bolt has connected with a semi-elliptical spring 3 in the manner shown in Figures 3 and 4, being the usual construction for springs, that is to say, the upper leaf of the spring is provided with a curved end for reception of the shackle bolt. The shackle bolts 28 and 31 are held in any convenient manner against longitudinal movement, such as illustrated in Figure 3, through the use of transverse cotter pins. Any other means may be employed, such as the method employed for the bolt 21, which is screw-threaded for reception of nuts on each end. Intermediate the shackle bolts 28 and 31, and carried by the lever, are lugs 32 and 32ª which are provided with aligned tapered bores, the bore in the lug 32 being greater in diameter than the bore in lug 32ª, and the shackle arms 29 and 30 are likewise provided with tapered bores which, when the lever is in the position shown in Figure 1, are in alignment with the bores in the lugs 32 and 32ª. In the position shown in Figures 1 and 3, a tapered safety pin 33 may be passed through the tapered bores in the shackle arms and the said lugs for holding the shackle arms and the said lever against any relative movement.

A frame member 34 is positioned beneath the vehicle and secured to the framing intermediate the sides of framing 4, which frame member 34 carries a depending bracket 35 and supports the leverage illustrated in Figure 6. This leverage includes the lever 36 which is intermediately carried for rotation by the bracket 35, as by means of a bolt 37, together with a hub 38 secured to lever 36, and surrounding said bolt and to which the hub is fastened, a radial lever 39. The lever 39 is at an angle to the lever 36. One end of the lever 36 is secured to a rod 40, the opposite end of said rod being secured to the tapered pin 33, as shown at 41 in Figure 3. The opposite side of the vehicle is controlled as to pin movement by a tie rod 40ª. Thus, if the lever 39 is moved by a rod 41 to rotate the lever 36, the rods 40 and 40ª are in turn moved to release the tapered pins 33 from engagement with the shackle arms and lugs 32 and 32ª. A cable 50 is secured to the lower end of the lever 22 and leads to the driver's compartment and to such mechanism as is employed for removing the tapered pins 33 from engagement with the shackle arms 29 and 30 and the lugs 32 and 32ª whereby the levers, upon release, may be swung from the position of Figure 1 to that of Figure 2 if, in fact, the levers do not move without any tensioning of the cables 50. It will be noted, upon reference to Figure 1, that the lever 22 lies at an angle relative to a plane normal to the axis of bolt 21, to the end that ordinary movement of spring 3 will not cause appreciable swinging movement of the said lever. However, when the tapered pin or pins 33 are released, the lever is easily moved from the position of Figure 1 to that of Figure 2, and the weight of the vehicle framing and all goods carried on the platform supported by said framing will, through the medium of the band 6, contact the tread of the tire, drum or wheel, to stop all rotation of the wheel, and stop forward movement of the vehicle.

Referring now to Figures 7 to 9, inclusive, we have provided a modified form of construction for changing the position of one end of the elliptical spring or springs to permit a dropping of the frame of the vehicle. In this instance, the framing is designated as 60, and the platform supported thereby as 61, together with the wheel and its tire as 62, the said wheel being mounted to a semi-elliptical spring 63. One side of the vehicle is illustrated, the opposite side being similar in construction and arrangement. One end of the semi-elliptical spring is secured to a shackle 64 which is fastened to the framing 60, and above the vehicle wheel and the tread of the tire is an arcuate brake band 65, similar to the band 6 for the embodiment of the invention shown in Figures 1 and 2. This band is of a width sufficient to overlie the tread of the tire transversely and may be mounted in any convenient manner to the framing and platform, employing the same type of bracket, as shown at 7 and 8 for Figures 1 and 2, or by other types of brackets mounted between the framing 60 and the platform 61, as depicted in Figures 7 and 8, the essential being that this band is rigidly secured to the framing of the vehicle. The opposite end of the semi-elliptical spring or springs 63 is releasably supported by means 66. This means constitutes a cylindrical member provided with a pair of aligned, semi-circular, annular type flanges 67 and 68 secured to the cylindrical member, the flanges extending above the periphery of the cylindrical member, as shown best in Figure 9. The cylindrical member is eccentrically mounted by means of a suitable bolt or stud shaft 69 to the framing 60, and in such a manner as to permit movement thereof from the position of Figure 7 to that of Figure 8. The end 70 of spring 63 is received between the flanges 67 and 68, and bears against the periphery of the cylindrical member, the said flanges acting as guides for this end of the spring. The cylindrical member is notched, as shown at 71, the notch being substantially of triangular form.

For the purpose of preventing rotation of the cylindrical member upon its pin or stud shaft 69, a dog 72 is provided. This dog has an end section corresponding to the section of the notch 71, and the dog is secured on the end of a rod 73, which rod is passed through a guide casing or bracket 74, mounted on the framing 60. A coil spring 75 surrounds the rod between the said dog and the guide casing 74. The rod is provided with an eye 76 for securing one end of a cable 77 which leads to the driver's compartment. The arrangement is such that the spring end 70 engages the periphery of the cylindrical member forwardly of the pivot point constituting the stud shaft or pin 69 in normal operation of the vehicle and in which position the band 65 is spaced above the tread of the wheel. In this position, the dog engages the notch 71 and is held so engaged, under spring tension by spring 75 so that the cylindrical member does not rotate. In the event, however, that it is desired to stop any rotation of the wheel 62, the operator pulls upon the cable 77 which will compress the spring 75 upon movement of the rod 73 to retract the dog 72 from the notch 71. Such release of the dog from the notch immediately causes rotation of the cylindrical member because the point of contact and pressure engagement between the spring end 70 with said cylindrical member is forwardly of the pivot point thereof. The said cylindrical member will then move from the position of Figure 7 to that of Figure 8, the bed or framing 60, together with the platform of the vehicle, immediately moving downwardly to bring the brake band 65 into engagement with the tread of the tire. In order to permit such movement of the cylindrical member, the platform may be slotted in the manner shown in Figure 8, at 78.

In Figures 10 and 11, we have illustrated a further modification of release means for permitting a changed position for one end of the spring to permit a brake band to engage the tread of a tire. In this form, we provide a pair of face cams 90 and 91, the cam 90 being secured to the vehicle body, such as to the platform portion thereof and against rotation, by providing an angular sided stud 92, centrally projecting from one face of the cam and fitted within an angular sided opening, the said stud having a screwthreaded extension 93 for receiving a nut 94 for locking the cam to the platform, while the face cam 91 which is similar in all respects to the cam 90, is provided with a stud shaft 95 which is passed through enlarged bores 96 in ends of one or more of the semi-elliptical springs, which shaft may be provided with a sprocket or gear at 97, which sprocket or gear is adapted to be rotated in any convenient manner, through suitable mechanism, under the control of the driver of the vehicle. Obviously, when the two face cams are in the position shown in Figure 10, separation is effected between the said cams, and the end of the semi-elliptical spring is spaced a given distance beneath the platform of the vehicle. When the shaft 95 is rotated in the direction of the arrow in Figure 11, the cam faces coincide as shown, and the semi-elliptical spring is capable of movement to a changed position, such as is permitted by body drop of the vehicle to bring the brake shoe into engagement with the tire tread.

The form of the invention shown in Figures 12 and 13 employs a wedge type block 100 mounted permanently to the vehicle framing, shown at 101, the inclined face of the wedge block being shown at 102. Positioned beneath the wedge type block 100 is a further wedge block 103 which may be transversely provided with anti-friction means, such as by rollers 104, and the inclined face 105 of said block with the projecting rollers is at the same inclination as the inclined face 102 of block 100. The lower or base portion of block 103 is likewise provided with anti-friction means 106. Block 103 is movable by hydraulic means which comprises an elongated arm or rod 107, secured to the block 103, and received within a cylinder 108, the rod 107 being suitably secured to a piston within said cylinder, the piston not being shown. Thus, a hydraulic control for the piston will be sufficient to move the block 103 from the position of Figure 12 to that of Figure 13, and the construction is such that the free end of the elliptical springs 109 may move from the position of Figure 12 to that of Figure 13. Frame construction of the type shown at 4 in Figure 5 may be employed, and the movable wedge block 103 will move and be supported within said frame structure, as shown in Figure 13.

The operation, uses and advantages of the invention described are as follows:

The form of the invention shown in Figures 1 to 9, inclusive, is adapted for single pairs of wheels with the spring exterior the body frame, while the form shown in Figures 10 to 13 may be utilized with springs which are inside, or directly under the body frame. However, regardless of the type of construction, each one of the means depicted, when moved or tripped, so releases one end of a spring, such as the semi-elliptical spring shown, to permit movement between the wheel axle and the frame and body of the truck. As stated, no particular type of truck is contemplated, as the invention is applicable to trailers as well and, in fact, may be incorporated in standard passenger vehicles. Although it is not shown in the drawings, it is equally possible to provide drums which are carried by the wheels and with which the arcuate bands, such as 6, may be brought into contact for the purpose of stopping movement of the wheels. In the case of vehicles which are provided with the usual fenders, the arcuate brake bands may be enclosed therein so as not to be visible externally of the vehicle. It is, of course, essential that normal flexing of the semi-elliptical springs is permitted without the tread of the wheel or any drum structure contacting the same. The device of the invention is to be utilized by the driver when the normal braking system is ineffective to stop the vehicle. The operator is provided with suitable controls within the driving compartment which he may actuate to either hydraulically trip a spring end to cause the entire load of the vehicle to change its position relative to the wheel structure so that a brake band which overlies suitable rotative means, such as the wheel structure, is brought into pressure engagement therewith.

The present invention may utilize a flat band in place of the arcuate band for contact with the tread of a tire, or other device associated with the wheel support for stopping rotation thereof. Such a construction may be used when the front wheels of a trailer turn with movement of the vehicle. In this instance, a planar curved band is secured to the body of the trailer and regardless of the turning movement of the wheels, the wheel treads may be brought into engagement with said band when the tripping mechanism is utilized, in accordance with the description of the several forms of the invention previously set forth herein.

We claim:

1. A vehicle having a load supporting frame, a semi-elliptical spring, a wheel secured intermediate the length of said spring, and a shackle fixedly mounting one end of said semi-elliptical spring to the vehicle frame, the combination therewith of: a brake shoe secured to the frame and superjacent the tread of the wheel, a cylindrical cam, means eccentrically mounting said cam for rotation to the vehicle frame, the opposite end of said elliptical spring freely engaging the periphery of said cam forwardly of said means, and means normally maintaining the cylindrical cam in position for spring support of the vehicle and releasable to cause rotation of the cam under vehicle load to release the spring from vehicle load support to move the brake shoe into engagement with the wheel tread.

2. The device set forth in claim 1; said second named means comprising a spring actuated locking dog secured to the vehicle frame, the cylindrical cam provided with a notch in the periphery thereof for receiving the locking dog.

3. The device set forth in claim 1; said cylindrical cam provided adjacent the periphery thereof with two spaced apart parallel flanges between which the free spring end is received for guiding movement of the spring end when the cylindrical cam rotates.

References Cited in the file of this patent

UNITED STATES PATENTS

| 367,965 | Dewey | Aug. 9, 1887 |
| 491,664 | Roberts et al. | Feb. 14, 1893 |
| 497,805 | Miller | May 23, 1893 |
| 2,663,048 | Ross et al. | Dec. 22, 1953 |
| 2,742,301 | Pointer | Apr. 17, 1956 |

FOREIGN PATENTS

| 1,281 | Germany | Nov. 24, 1877 |
| 43,545 | Germany | Dec. 15, 1887 |
| 4,464 | Great Britain | of 1876 |
| 3,885 | Great Britain | of 1907 |
| 160,633 | Great Britain | Mar. 31, 1921 |